US012679938B2

(12) United States Patent
Sasaki et al.

(10) Patent No.: US 12,679,938 B2
(45) Date of Patent: Jul. 14, 2026

(54) GLASS FIBERS FOR RESIN REINFORCEMENT USE AND GLASS FIBER-REINFORCED RESIN MOLDED ARTICLE

(71) Applicant: NITTO BOSEKI CO., LTD., Fukushima (JP)

(72) Inventors: Ryo Sasaki, Fukushima (JP); Yosuke Nukui, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 482 days.

(21) Appl. No.: 18/287,262

(22) PCT Filed: Jun. 3, 2022

(86) PCT No.: PCT/JP2022/022613
§ 371 (c)(1),
(2) Date: Oct. 17, 2023

(87) PCT Pub. No.: WO2023/007948
PCT Pub. Date: Feb. 2, 2023

(65) Prior Publication Data
US 2024/0218134 A1     Jul. 4, 2024

(30) Foreign Application Priority Data
Jul. 26, 2021    (JP) ................................. 2021-121686

(51) Int. Cl.
*C08J 5/08*          (2006.01)
*C03C 25/40*         (2006.01)

(52) U.S. Cl.
CPC ................. *C08J 5/08* (2013.01); *C03C 25/40* (2013.01); *C08J 2371/08* (2013.01)

(58) Field of Classification Search
None
See application file for complete search history.

(56) References Cited

U.S. PATENT DOCUMENTS

| | | | |
|---|---|---|---|
| 5,141,802 A | 8/1992 | Parrinello et al. | |
| 2009/0162609 A1 | 6/2009 | Lee et al. | |
| 2018/0094110 A1 | 4/2018 | Nakanishi et al. | |
| 2022/0145021 A1 | 5/2022 | Nukui et al. | |

FOREIGN PATENT DOCUMENTS

| | | |
|---|---|---|
| JP | H02-72908 A | 3/1990 |
| JP | 2000-044793 A | 2/2000 |
| JP | 2002-145889 A | 5/2002 |
| JP | 2020-158945 A | 10/2020 |
| JP | 6901055 B1 | 7/2021 |
| WO | 2016/175248 A1 | 11/2016 |

OTHER PUBLICATIONS

The extended European Search Report dated Feb. 17, 2025 issued in the corresponding EP Patent Application No. 22849027.2.

*Primary Examiner* — Cheng Yuan Huang
(74) *Attorney, Agent, or Firm* — Carrier, Shende & Associates P.C.; Joseph P. Carrier; Fulchand P. Shende

(57)            ABSTRACT

Provided is a glass fiber for resin reinforcement that has excellent processability, and enables a fiber-reinforced resin molded article having excellent mechanical properties to be obtained. The glass fiber for resin reinforcement comprises a glass fiber, and organic matter adhered to the surface of the glass fiber, wherein the amount of nitrogen N of the organic matter is 0.010 to 0.600% by mass based on the total amount of the glass fiber for resin reinforcement, the amount of carbon C of the organic matter is 0.120 to 1.500% by mass based on the total amount of the glass fiber for resin reinforcement, the ignition loss L of the glass fiber for resin reinforcement is 0.200 to 2.000% by mass, and the N, C, and L satisfy the following formula (1): $0.220 \leq (N \times C)^{1/2}/L \leq 0.405$ . . . (1).

9 Claims, No Drawings

GLASS FIBERS FOR RESIN REINFORCEMENT USE AND GLASS FIBER-REINFORCED RESIN MOLDED ARTICLE

TECHNICAL FIELD

The present invention relates to a glass fiber for resin reinforcement and a glass fiber-reinforced resin molded article.

BACKGROUND ART

In recent years, fiber-reinforced resin materials are attracting attention as alternative materials for metal. However, since the heat resistance of resin is inferior to that of metal, the substitution of metal with fiber-reinforced resin materials is not progressed in applications requiring high heat resistance. In such a circumstance, a fiber-reinforced resin molded article available in applications requiring high heat resistance is examined.

Usually, in a reinforced fiber used in the fiber-reinforced resin molded article, to improve the adhesiveness between the reinforced fiber and resin and improve the strength of the fiber-reinforced resin molded article, organic matter is adhered to the surface of the reinforced fiber. For example, when the reinforced fiber is a glass fiber, a sizing agent containing a urethane resin, a coupling agent, and a lubricant is known as organic matter (e.g., see Patent Literature 1). The above urethane resin includes a xylylene diisocyanate component and a polyester polyol component as constitutional units.

However, there is a problem in that, even when the sizing agent described in Patent Literature 1 is adhered to the surface of the glass fiber, the glass fiber and the resin such as polyetherimide or polyether ether ketone cannot be sufficiently closely adhered, so that sufficient mechanical properties cannot be obtained in the glass fiber-reinforced resin molded article.

To solve the above problem, when an acid and a silane coupling agent are adhered to the surface of a glass fiber for resin reinforcement, it is suggested to use an acid having an average hydrogen number at the α-carbon position of a carboxyl group of 0.5 or more as the acid, and to set the amount of adhered acid to the range of 10 to 400 ppm based on the total amount of the glass fiber for resin reinforcement (e.g., see Patent Literature 2).

Patent Literature 2 indicates that the mechanical properties of the glass fiber-reinforced resin molded article can be improved by adhering the above acid and the above silane coupling agent to the surface of the above glass fiber for resin reinforcement.

CITATION LIST

Patent Literature

Patent Literature 1: Japanese Patent Laid-Open No. 2000-44793
Patent Literature 2: Japanese Patent Laid-Open No. 2020-158945

SUMMARY OF INVENTION

Technical Problem

However, the combination of the acid and the silane coupling agent described in Patent Literature 2 has disadvantages in that the bundling properties of the glass fiber bundle are low when the combination is adhered to the surface of the glass fiber for resin reinforcement, and fuzzing is likely to be generated when the glass fiber bundle is cut into chopped strands or the chopped strands are kneaded with resin to form resin pellets, resulting in significantly reduced processability.

Therefore, an object of the present invention is to provide a glass fiber for resin reinforcement that resolves such disadvantages, comprises excellent processability, and enables a glass fiber-reinforced resin molded article comprising excellent mechanical properties to be obtained.

Solution to Problem

The present inventors have made intensive studies on organic matter adhered to the surface of the glass fiber for resin reinforcement, and as a result, found that, by setting the amount of nitrogen N of the organic matter to a specific range based on the total amount of the glass fiber for resin reinforcement, the glass fiber for resin reinforcement can comprise excellent processability, and a fiber-reinforced resin molded article comprising excellent mechanical properties can be obtained by the glass fiber for resin reinforcement, thereby achieving the present invention.

In order to achieve the above object, the glass fiber for resin reinforcement of the present invention is a glass fiber for resin reinforcement, comprising a glass fiber, and organic matter adhered to a surface of the glass fiber, wherein the amount of nitrogen N of the organic matter is in the range of 0.010 to 0.600% by mass based on the total amount of the glass fiber for resin reinforcement, the amount of carbon C of the organic matter is in the range of 0.120 to 1.500% by mass based on the total amount of the glass fiber for resin reinforcement, the ignition loss L of the glass fiber for resin reinforcement is in the range of 0.200 to 2.000% by mass, and the N, C, and L satisfy the following formula (1):

$$0.220 \le (N \times C)^{1/2} / L \le 0.405 \qquad (1)$$

The amount of nitrogen N and the amount of carbon C of the organic matter adhered to the glass fiber surface being in the above ranges based on the total amount of the glass fiber for resin reinforcement, the ignition loss L of the glass fiber for resin reinforcement being in the above range, and the N, C, and L satisfying the above formula (1) allow the glass fiber for resin reinforcement of the present invention to comprise excellent processability, and also allow a glass fiber-reinforced resin molded article comprising excellent mechanical properties to be obtained.

Here, "the glass fiber for resin reinforcement comprises excellent processability" means that the easy cuttability evaluation and the kneader fuzz evaluation described below are A or B. In addition, "the fiber-reinforced resin molded article comprises excellent mechanical properties" means that the tensile strength of the fiber-reinforced resin molded article is 200 MPa or more, the flexural strength is 305 MPa or more, and the notched Izod impact strength is 13 KJ/m$^2$ or more.

In the glass fiber for resin reinforcement of the present invention, when the amount of nitrogen N of the organic matter is less than 0.010% by mass based on the total amount of the glass fiber for resin reinforcement, the adhesiveness between the glass fiber and the resin is insufficient. When the amount of nitrogen N of the organic matter is more than 0.600% by mass based on the total amount of the glass fiber for resin reinforcement, there occur problems such that the texture of the glass fiber is solid, the yield in processing the glass fiber into a glass fiber article deteriorates, filaments are easily broken, and fuzzing is increased.

The glass fiber for resin reinforcement of the present invention has disadvantages in that, when the amount of carbon C of the organic matter is less than 0.120% by mass based on the total amount of the glass fiber for resin reinforcement, a glass fiber bundle is not sufficiently bundled, the glass fiber bundle frays during transferring, cutting, and the like of the glass fiber bundle, fuzz is generated to be turned into floc, which deteriorates processability. The glass fiber for resin reinforcement of the present invention also has disadvantages in that, when the amount of carbon C of the organic matter is more than 1.500% by mass based on the total amount of the glass fiber for resin reinforcement, a large amount of cracked gas derived from organic matter is generated during the molding of a glass fiber-reinforced resin, which impairs the appearance and mechanical strength of the glass fiber-reinforced resin.

The glass fiber for resin reinforcement of the present invention has disadvantages in that, when the ignition loss L is less than 0.200% by mass, a glass fiber bundle is not sufficiently bundled, the glass fiber bundle frays during transferring, cutting, and the like of the glass fiber bundle, fuzzing is generated to be turned into floc, which deteriorates processability. The glass fiber for resin reinforcement of the present invention also has disadvantages in that, when the ignition loss L is more than 2.000% by mass, a large amount of cracked gas derived from organic matter is generated during the molding of a glass fiber-reinforced resin, which impairs the appearance and mechanical strength of the glass fiber-reinforced resin.

The amount of nitrogen N and the amount of carbon C of the organic matter can be determined by, for example, measuring the amount of carbon dioxide gas in the gas generated by igniting 200 to 400 mg of the glass fiber for resin reinforcement (e.g., chopped strand) at a temperature of 900° C. for 250 seconds and the amount of nitrogen gas obtained by reducing a nitrogen oxide with reduced copper by gas chromatography using an NC analyzer (manufactured by Sumika Chemical Analysis Service, Ltd., trade name: SUMIGRAPH NC-TRINITY). The amount of carbon dioxide gas and the amount of nitrogen gas are measured as the proportion of the mass of these gases based on the mass of the glass fiber for resin reinforcement set to the NC analyzer.

The ignition loss can be measured in accordance with JIS R 3420:2013.

The easy cuttability evaluation can be conducted by measuring the mass of the chopped strands passed through a sieve when 1 kg of chopped strands obtained by cutting the glass fiber for resin reinforcement into a length of 3 mm are taken in 100 g portions on a plain metal sieve having a frame diameter of 200 mm, an opening of 2.8 mm, and a wire diameter of 1.12 mm in accordance with JIS Z 8801-1:2019 and shaken for 30 seconds. In the easy cuttability evaluation, the proportion of the mass of the chopped strands passed through the sieve to the mass of the chopped strands before being sieved of 60% by mass or more and 100% by mass or less is evaluated as A, the proportion of 40% by mass or more and less than 60% by mass is evaluated as B, and the proportion of 0% by mass or more and less than 40% by mass is evaluated as C.

When the processability of the glass fiber is reduced, the length of the chopped strand is longer than the predetermined length when the glass fiber is cut into chopped strands. Chopped strands longer than the predetermined length are required to be removed after a cutting step, resulting in deteriorated processability and deteriorated yield. Thus, in the present application, the easy cuttability evaluation is used as an index for evaluating the processability.

The kneader fuzz evaluation can be conducted by putting 1 kg of the glass fiber for resin reinforcement in a kneading chamber of a double arm kneader (manufactured by Nihon Spindle Manufacturing Co., Ltd., trade name: SR1-1), placing a weight of 6 kg thereon, kneading the glass fiber for resin reinforcement for 4 min, and then measuring the mass of the fuzz generated. In the kneader fuzz evaluation, the mass of fuzz of 0.15 kg or less is evaluated as A, the mass of fuzz of more than 0.15 kg and 0.30 kg or less is evaluated as B, and the mass of fuzz of more than 0.30 kg and 0.60 kg or less is evaluated as C.

The tensile strength is a value measured by using an A-type dumbbell test piece (thickness: 4 mm) in accordance with JIS K 7164:2005 made of the fiber-reinforced resin molded article under a condition of a test temperature of 23° C. using a precision universal tester (manufactured by Shimadzu Corporation, trade name: Autograph AG-Xplus50 kN) in accordance with JIS K 7164:2005.

The flexural strength is a value obtained by processing the A-type dumbbell test piece (thickness: 4 mm) in accordance with JIS K 7164:2005 made of the fiber-reinforced resin molded article to a class I test piece and measuring the test piece under a condition of a test temperature of 23° C. using a precision universal tester (manufactured by Shimadzu Corporation, trade name: Autograph AG-Xplus50 kN) in accordance with JIS K 7017:1999.

The notched Izod impact strength is a value obtained by processing the A-type dumbbell test piece (thickness: 4 mm) in accordance with JIS K 7164:2005 made of the fiber-reinforced resin molded article to a type 1 test piece having a type A notch and measuring the test piece in accordance with JIS K 7110:1999.

In the glass fiber for resin reinforcement of the present invention, when the amount of nitrogen N and the amount of carbon C of the organic matter adhered to the glass fiber surface are in the above ranges based on the total amount of the glass fiber for resin reinforcement and the ignition loss L of the glass fiber for resin reinforcement is in the above range, the N and C preferably satisfy the following formula (a), and further preferably satisfy the following formula (b).

$$2.90 \leq C/N \leq 6.50 \qquad \text{(a)}$$

$$4.85 \leq C/N \leq 6.20 \qquad \text{(b)}$$

When the amount of nitrogen N and the amount of carbon C of the organic matter adhered to the glass fiber surface are in the above ranges based on the total amount of the glass fiber for resin reinforcement and the ignition loss L of the glass fiber for resin reinforcement is in the above range, the N and C satisfying the above formula (a) allow the glass fiber for resin reinforcement of the present invention to comprise excellent processability, and also allow a fiber-reinforced resin molded article comprising further excellent mechanical properties to be obtained.

When the amount of nitrogen N and the amount of carbon C of the organic matter adhered to the glass fiber surface are in the above ranges based on the total amount of the glass fiber for resin reinforcement and the ignition loss L of the glass fiber for resin reinforcement is in the above range, the N and C satisfying the above formula (b) allow the glass fiber for resin reinforcement of the present invention to comprise further excellent processability, and also allow a fiber-reinforced resin molded article comprising further excellent mechanical properties to be obtained.

Here, "to have further excellent processability" means that the easy cuttability evaluation of the glass fiber for resin reinforcement is A. In addition, "the fiber-reinforced resin molded article comprises further excellent mechanical properties" means that the tensile strength of the fiber-reinforced resin molded article is 200 MPa or more, the flexural strength thereof is 315 MPa or more, and the notched Izod impact strength thereof is 13 KJ/m$^2$ or more.

In the glass fiber for resin reinforcement of the present invention, it is preferable that the amount of nitrogen N of the organic matter be in the range of 0.030 to 0.270% by mass based on the total amount of the glass fiber for resin reinforcement, the amount of carbon C of the organic matter be in the range of 0.300 to 1.200% by mass based on the total amount of the glass fiber for resin reinforcement, the ignition loss L of the glass fiber for resin reinforcement be in the range of 0.400 to 1.800% by mass, and the N, C, and L satisfy the following formula (2).

$$0.245 \le (N \times C)^{1/2} / L \le 0.274 \qquad (2)$$

The amount of nitrogen N and the amount of carbon C of the organic matter adhered to the glass fiber surface based on the total amount of the glass fiber for resin reinforcement being in the above ranges, the ignition loss L of the glass fiber for resin reinforcement being in the above range, and the N, C, and L satisfying the above formula (2) more securely allow the glass fiber for resin reinforcement of the present invention to comprise further excellent processability, and also more securely allow the fiber-reinforced resin molded article comprising excellent mechanical properties to be obtained.

In the glass fiber for resin reinforcement of the present invention, the amount of nitrogen N of the organic matter is further preferably in the range of 0.040 to 0.200% by mass, particularly preferably in the range of 0.060 to 0.180% by mass, and most preferably in the range of 0.090 to 0.150% by mass based on the total amount of the glass fiber for resin reinforcement.

In the glass fiber for resin reinforcement of the present invention, the amount of carbon C of the organic matter is further preferably in the range of 0.400 to 1.000% by mass, particularly preferably in the range of 0.450 to 0.800% by mass, and most preferably in the range of 0.500 to 0.700% by mass based on the total amount of the glass fiber for resin reinforcement.

In the glass fiber for resin reinforcement of the present invention, the ignition loss L is further preferably in the range of 0.600 to 1.500% by mass, particularly preferably in the range of 0.700 to 1.400% by mass, especially preferably in the range of 0.850 to 1.300% by mass, and most preferably in the range of 0.950 to 1.200% by mass.

In the glass fiber for resin reinforcement of the present invention, the organic matter preferably comprises a silane coupling agent containing nitrogen (hereinafter, sometimes referred to as a nitrogen-containing silane coupling agent).

In the glass fiber for resin reinforcement of the present invention, the organic matter preferably comprises a film former.

In the glass fiber for resin reinforcement of the present invention, the glass fiber can be in any one form selected from the group consisting of chopped strand, roving, chopped strand mat, and milled fiber.

The glass fiber-reinforced resin molded article of the present invention comprises the glass fiber for resin reinforcement, and a thermoplastic resin having a glass transition temperature of 100° C. or more.

The glass fiber-reinforced resin molded article of the present invention preferably comprises any of the above glass fibers for resin reinforcement, and polyaryl ether ketone.

DESCRIPTION OF EMBODIMENTS

Hereinafter, embodiments of the present invention will be described in detail.

The glass fiber for resin reinforcement of the present embodiment is a glass fiber for resin reinforcement, comprising a glass fiber, and organic matter adhered to a surface of the glass fiber, wherein the amount of nitrogen N of the organic matter is in the range of 0.010 to 0.600% by mass, the amount of carbon C of the organic matter is in the range of 0.120 to 1.500% by mass based on the total amount of the glass fiber for resin reinforcement, the ignition loss L of the glass fiber for resin reinforcement is in the range of 0.200 to 2.000% by mass, and the N, C, and L satisfy the following formula (1).

$$0.220 \le (N \times C)^{1/2} / L \le 0.405 \qquad (1)$$

Here, when the proportion of the N to the L is increased, the mechanical properties of the glass fiber-reinforced resin molded article comprising the glass fiber for resin reinforcement of the present embodiment tend to be improved, but the proportion of the C to the L is relatively reduced. When the proportion of the C to the L is increased, the processability of the glass fiber for resin reinforcement of the present embodiment tends to be improved, but the proportion of the N to the L is relatively reduced. In consideration of these tendencies, the formula (1) is presumed to represent the balance between the mechanical properties of the glass fiber-reinforced resin molded article comprising the glass fiber for resin reinforcement of the present embodiment and the processability of the glass fiber for resin reinforcement of the present embodiment. Note that, the proportion of the N to the L can be adjusted by, for example, the content of the nitrogen-containing silane coupling agent or nitrogen content adjuster described below based on the total amount of the organic matter adhered to the glass fiber surface.

In the glass fiber for resin reinforcement of the present embodiment, it is preferable that the amount of nitrogen N of the organic matter be in the range of 0.030 to 0.270% by mass based on the total amount of the glass fiber for resin reinforcement, the amount of carbon C of the organic matter be in the range of 0.300 to 1.200% by mass based on the total amount of the glass fiber for resin reinforcement, the ignition loss L of the glass fiber for resin reinforcement be in the range of 0.400 to 1.800% by mass, and the N, C, and L satisfy the above formula (1).

It is preferable in the glass fiber for resin reinforcement of the present embodiment that, when the N, C, and L satisfy the above formula (1), the N and C satisfy the following formula (a).

$$2.90 \leq C/N \leq 6.50 \tag{a}$$

Here, when the proportion of the C to the N is increased, the processability of the glass fiber for resin reinforcement of the present embodiment tends to be improved, but the mechanical properties of the glass fiber-reinforced resin molded article comprising the glass fiber for resin reinforcement of the present embodiment tend to be reduced. Therefore, the above formula (a) is presumed to represent the balance between the processability of the glass fiber for resin reinforcement of the present embodiment and the mechanical properties of the glass fiber-reinforced resin molded article comprising the glass fiber for resin reinforcement of the present embodiment. Note that, the proportion of the C to the N can be adjusted by, for example, the content of the nitrogen-containing silane coupling agent or nitrogen content adjuster described below based on the total amount of the organic matter adhered to the glass fiber surface.

In the glass fiber for resin reinforcement of the present embodiment, when the N, C, and L satisfy the above formula (1), the N and C more preferably satisfy the following formula (b), further preferably satisfy the following formula (c), particularly preferably satisfy the following formula (d), and most preferably satisfy the following formula (e).

$$4.85 \leq C/N \leq 6.20 \tag{b}$$

$$4.90 \leq C/N \leq 5.90 \tag{c}$$

$$4.95 \leq C/N \leq 5.60 \tag{d}$$

$$5.00 \leq C/N \leq 5.40 \tag{e}$$

In the glass fiber for resin reinforcement of the present embodiment, it is more preferable that the amount of nitrogen N of the organic matter be in the range of 0.030 to 0.270% by mass based on the total amount of the glass fiber for resin reinforcement, the amount of carbon C of the organic matter be in the range of 0.300 to 1.200% by mass based on the total amount of the glass fiber for resin reinforcement, the ignition loss L of the glass fiber for resin reinforcement be in the range of 0.400 to 1.800% by mass, and the N, C, and L satisfy the following formula (2).

$$0.245 \leq (N \times C)^{1/2}/L \leq 0.274 \tag{2}$$

In the glass fiber for resin reinforcement of the present embodiment, it is further preferable that the amount of nitrogen N of the organic matter be in the range of 0.040 to 0.200% by mass based on the total amount of the glass fiber for resin reinforcement, the amount of carbon C of the organic matter be in the range of 0.400 to 1.000% by mass based on the total amount of the glass fiber for resin reinforcement, the ignition loss L of the glass fiber for resin reinforcement be in the range of 0.600 to 1.500% by mass, and the N, C, and L satisfy the above formula (2).

In the glass fiber for resin reinforcement of the present embodiment, it is especially preferable that the amount of nitrogen N of the organic matter be in the range of 0.060 to 0.180% by mass based on the total amount of the glass fiber for resin reinforcement, the amount of carbon C of the organic matter be in the range of 0.450 to 0.800% by mass based on the total amount of the glass fiber for resin reinforcement, the ignition loss L of the glass fiber for resin reinforcement be in the range of 0.700 to 1.400% by mass, and the N, C, and L satisfy the above formula (2).

In the glass fiber for resin reinforcement of the present embodiment, when the N, C, and L satisfy the above formula (2), the N and C preferably satisfy the above formula (b), more preferably satisfy the above formula (c), particularly preferably satisfy the above formula (d), and particularly preferably satisfy the above formula (e).

In the glass fiber for resin reinforcement of the present embodiment, it is particularly preferable that the amount of nitrogen N of the organic matter be in the range of 0.060 to 0.180% by mass based on the total amount of the glass fiber for resin reinforcement, the amount of carbon C of the organic matter be in the range of 0.450 to 0.800% by mass based on the total amount of the glass fiber for resin reinforcement, the ignition loss L of the glass fiber for resin reinforcement be in the range of 0.700 to 1.400% by mass, and the N, C, and L satisfy the following formula (3).

$$0.259 \leq (N \times C)^{1/2}/L \leq 0.270 \tag{3}$$

In the glass fiber for resin reinforcement of the present embodiment, it is most preferable that the amount of nitrogen N of the organic matter be in the range of 0.090 to 0.150% by mass based on the total amount of the glass fiber for resin reinforcement, the amount of carbon C of the organic matter be in the range of 0.500 to 0.700% by mass based on the total amount of the glass fiber for resin reinforcement, the ignition loss L of the glass fiber for resin reinforcement be in the range of 0.950 to 1.200% by mass, and the N, C, and L satisfy the above formula (3).

In the glass fiber for resin reinforcement of the present embodiment, when the N, C, and L satisfy the above formula (3), the N and C preferably satisfy the above formula (d), and more preferably satisfy the above formula (e).

The glass composition of glass that forms the glass fiber constituting the glass fiber for resin reinforcement of the present embodiment is not particularly limited, and examples thereof can include the most common E glass composition, a high strength and high modulus glass composition, a high modulus and easily-producible glass composition, and a low dielectric constant and low dielectric tangent glass composition.

The above E glass composition is a composition including $SiO_2$ in the range of 52.0 to 56.0% by mass, $Al_2O_3$ in the range of 12.0 to 16.0% by mass, MgO and CaO in the range of 20.0 to 25.0% by mass in total, and $B_2O_3$ in the range of 5.0 to 10.0% by mass, with respect to the total amount of the glass fiber.

The above high strength and high modulus glass composition is a composition including $SiO_2$ in the range of 60.0 to 70.0% by mass, $Al_2O_3$ in the range of 20.0 to 30.0% by mass, MgO in the range of 5.0 to 15.0% by mass, $Fe_2O_3$ in the range of 0 to 1.5% by mass, and $Na_2O$, $K_2O$, and $Li_2O$ in the range of 0 to 0.2% by mass in total, with respect to the total amount of the glass fiber.

The above high modulus and easily-producible glass composition is a composition including $SiO_2$ in the range of 57.0 to 60.0% by mass, $Al_2O_3$ in the range of 17.5 to 20.0% by mass, MgO in the range of 8.5 to 12.0% by mass, CaO in the range of 10.0 to 13.0% by mass, and $B_2O_3$ in the range of 0.5 to 1.5% by mass, with respect to the total amount of the glass fiber, in which the total amount of $SiO_2$, $Al_2O_3$, MgO, and CaO is 98.0% by mass or more.

The above low dielectric constant and low dielectric tangent glass composition is a composition including $SiO_2$ in the range of 48.0 to 62.0% by mass, $B_2O_3$ in the range of 17.0 to 26.0% by mass, $Al_2O_3$ in the range of 9.0 to 18.0% by mass, CaO in the range of 0.1 to 9.0% by mass, MgO in the range of 0 to 6.0% by mass, $Na_2O$, $K_2O$, and $Li_2O$ in the range of 0.05 to 0.5% by mass in total, $TiO_2$ in the range of 0 to 5.0% by mass, SrO in the range of 0 to 6.0% by mass, $F_2$ and $Cl_2$ in the range of 0 to 3.0% by mass in total, and $P_2O_5$ in the range of 0 to 6.0% by mass, with respect to the total amount of the glass fiber.

From the viewpoint of improving the heat resistance of the fiber-reinforced resin molded article using the glass fiber for resin reinforcement, the glass composition of glass that forms the glass fiber constituting the glass fiber for resin reinforcement of the present embodiment is preferably the high strength and high modulus glass composition.

The measurement of the content of each component of the above glass compositions can be conducted as follows.

First, the glass fiber is cut to an appropriate size, then placed in a platinum crucible and melted with stirring while being held at a temperature of 1550° C. for 6 hours in an electric furnace to obtain a homogeneous molten glass. Then, the obtained molten glass is poured onto a carbon plate to produce a glass cullet, and then the glass cullet is pulverized and powdered to obtain glass powder.

Regarding Li as a light element, the glass powder is thermally decomposed with an acid and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above content (% by mass) of each component can be determined from these numerical values.

When organic matter adheres to the surface of the glass fiber, or when glass fiber is mainly included as a reinforcing material in organic matter (resin), the glass fiber is used after the organic matter is removed by, for example, heating for about 0.5 to 24 hours in a muffle furnace at 300 to 650° C.

The glass fiber for resin reinforcement of the present embodiment is produced as follows. First, a glass raw material (glass batch) prepared to have the above composition is supplied to a melting furnace and melted at a temperature in the range of 1450 to 1550° C., for example. Then, the melted glass batch (melted glass) is drawn from 1 to 30000 nozzle tips of a bushing controlled at a predetermined temperature and rapidly cooled to form glass filaments. Subsequently, the glass filaments formed are applied with a sizing agent or binder using an applicator as an application apparatus. While 1 to 30000 of the glass filaments are bundled using a bundling shoe, the glass filaments are wound on a tube at a high speed using a winding apparatus to obtain glass fiber.

The cross-sectional shape of the glass filaments constituting the glass fiber of the present embodiment is usually a circular shape. The fiber diameter of the glass filaments can be calculated by, for example, first, producing a glass fiber-reinforced resin molded article using the glass fiber of the present embodiment, polishing the cross section of the glass fiber-reinforced resin molded article, then measuring the diameters of 100 or more glass filaments using an electron microscope, and determining the average value of the measured diameters.

The fiber diameter of the glass filaments having the circular cross-sectional shape is preferably in the range of 3.0 μm to 35.0 μm, more preferably in the range of 4.0 to 30.0 μm, further preferably in the range of 4.5 to 25.0 μm, particularly preferably in the range of 5.0 to 20.0 μm, and most preferably in the range of 6.0 to 15.5 μm.

Here, allowing the nozzle tip to have a non-circular shape and to have a protrusion or a notch for rapidly cooling the molten glass and controlling the temperature conditions can provide the glass fiber constituted by glass filaments having a flat cross-sectional shape.

When the glass filaments have a flat cross-sectional shape, examples of the shape thereof can include a long-oval shape, an oval shape, and a rectangle. Here, the long-oval shape means a shape obtained by replacing each shorter side of a rectangle by a semicircle having a diameter corresponding to the shorter side. The converted fiber diameter of the glass filaments having a flat cross-sectional shape is preferably in the range of 3.0 μm to 35.0 μm, preferably in the range of 4.0 to 30.0 μm, more preferably in the range of 4.5 to 25.0 μm, further preferably in the range of 5.0 to 20.0 μm, and particularly preferably in the range of 6.0 to 15.5 μm. Here, the converted fiber diameter of the glass filaments having a flat cross-sectional shape means a diameter of a perfect circle having the same area as the area of the cross-sectional shape of the glass filaments having a flat cross-sectional shape. The cross section of the glass filaments means a transverse cross section perpendicular to the fiber length direction of the glass fiber.

The converted fiber diameter of the glass filaments can be calculated by, for example, first, producing a glass fiber-reinforced resin molded article using the glass fiber of the present embodiment, polishing the cross section of the glass fiber-reinforced resin molded article, then calculating the cross-sectional areas of 100 or more glass filaments using an electron microscope, calculating the converted fiber diameters based on the cross-sectional areas, and then determining the average value of the calculated converted fiber diameters.

When the glass filaments constituting the glass fiber has a flat cross-sectional shape, the ratio of the major axis to the minor axis (major axis/minor axis) in the cross section is, for example, in the range of 2.0 to 10.0, is preferably in the range of 3.0 to 8.0.

When the glass filaments constituting the glass fiber has a flat cross-sectional shape, the ratio of the major axis to the minor axis (major axis/minor axis) in the cross section can be calculated by measuring each length of 100 or more glass filaments by taking the longest side that passes through the substantial center of the glass filament cross section as the major axis and the side that orthogonally intersects the major axis at the substantial center of the glass filament cross section as the minor axis using an electron microscope, and determining the average values thereof. The glass fiber can be in any one form selected from the group consisting of chopped strand, roving, chopped strand mat, and milled fiber.

The chopped strand has a number of glass filaments constituting the glass fiber (also referred to as a glass fiber bundle or glass strands) of preferably in the range of 1 to 30000, more preferably in the range of 50 to 10000, and further preferably in the range of 1000 to 8000, and is a form in which the glass fiber is preferably cut into a length in the range of 1.0 to 100.0 mm, more preferably a length in the range of 1.2 to 51.0 mm, further preferably a length in the range of 1.5 to 30.0 mm, particularly preferably a length in the range of 2.0 to 15.0 mm, and most preferably a length in the range of 2.3 to 7.8 mm.

The roving is a form in which the number of glass filaments constituting the glass fiber is in the range of 10 to 30000 and which is obtained without cutting. For example, the roving has a mass in the range of 1000 to 10000 tex (g/1000 m).

The chopped strand mat is a form obtained by dispersing the glass fibers cut into a length in the range of 40 to 150 mm, in random directions on a plane, and forming these into a mat shape by a resin binder. For example, the chopped strand mat has a mass per unit area of 30 to 300 g/m$^2$.

The milled fiber is a form in which the number of glass filaments constituting the glass fiber is in the range of 1 to 30000, and pulverized into a length in the range of 1 to 900 μm by a publicly known method such as a ball mill or a Henschel mixer.

The glass fiber for resin reinforcement of the present embodiment is coated with organic matter in which the surface of the glass fiber is adhered to the surface thereof. Examples of the organic matter can include a nitrogen-containing silane coupling agent, a film former (a film forming agent), a nitrogen content adjuster, a lubricant, a surfactant, and a composition containing a plurality of them.

The organic matter is preferably a composition containing a nitrogen-containing silane coupling agent or a film former, more preferably a composition containing a nitrogen-containing silane coupling agent and further containing a film former, and further preferably a composition containing a nitrogen-containing silane coupling agent and a film former and further containing a nitrogen content adjuster.

The organic matter is adhered to the glass fiber at a proportion of 0.200 to 2.000% by mass based on the mass of the glass fiber in a state where the organic matter is not adhered thereto.

Examples of the method for adhering the organic matter to the surface of the glass fiber can include a method for conducting treatment of applying a sizing agent or a binder having the composition on the surface of the glass fiber by using a publicly known method such as a roller applicator and drying it, when the glass fiber is produced as described above, a method for conducting treatment of allowing the glass fiber to pass through a treatment tank holding a treatment liquid having the composition and drying it after producing the glass fiber, and a method for conducting treatment of spraying a treatment liquid having the composition on the surface of the glass fiber by using a spray and drying it.

The amount of the organic matter adhered to the surface of the glass fiber can be adjusted by the concentration of the solid content in the treatment liquid (containing the sizing agent or the binder), the number of times of treatment, or the like. Here, the solid content refers to the component that remains without volatilizing after the treatment liquid is dried at 110° C. for 1 hour.

Examples of the nitrogen-containing silane coupling agent can include aminosilanes, cationic silanes, phenylaminosilanes, ureidosilanes, isocyanate silanes, isocyanurate silanes, imidazole silane coupling agents, and silanes having a triazine ring.

As the nitrogen-containing silane coupling agent, since the nitrogen-containing silane coupling agent has high storage stability, is easily dissolved in cold water, and has high solution stability as a sizing agent or a binder, aminosilane, cationic silane, or ureidosilane is preferable, aminosilane or ureidosilane is more preferable, and aminosilane is further preferable.

As the nitrogen-containing silane coupling agent, these compounds can be used singly or in combination of two or more.

Examples of the aminosilane include γ-aminopropyltriethoxysilane, γ-aminopropyltrimethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

Examples of the cationic silane include N-(vinylbenzyl)-2-aminoethyl-3-aminopropyltrimethoxysilane hydrochloride and N-phenyl-3-aminopropyltrimethoxysilane hydrochloride.

Examples of the phenylaminosilane can include N-phenyl-3-aminopropyl trimethoxysilane.

Examples of the ureidosilane can include 3-ureidopropyltrialkoxysilane.

Examples of the isocyanate silane can include 3-isocyanate propyltriethoxysilane.

Examples of the isocyanurate silane can include tris-(trimethoxysilylpropyl)isocyanurate.

Examples of the imidazole silane coupling agent can include a silane coupling agent synthesized by a dehydrochlorination reaction of chloroalkylsilane with imidazole, and a silane coupling agent synthesized by a reaction of imidazole with an epoxy silane coupling agent.

Examples of the silane having a triazine ring can include a compound having a diamino triazinyl group and a hydrolyzable silyl group (e.g., VD-5 (trade name) manufactured by SHIKOKU CHEMICALS CORPORATION).

The nitrogen-containing silane coupling agent contained in the organic matter adhered to the surface of the glass fiber for resin reinforcement of the present embodiment can be detected by heating the glass fiber in water at 65° C., concentrating the extract, and then analyzing it by $^1$H-NMR.

Examples of the film former (film forming agent) can include emulsions and solutions such as urethane resins, epoxy resins, vinyl acetate resins, unsaturated polyesters, vinyl ester resins, modified polypropylene, copolymers of unsaturated monomers, polyamide, polyolefin, phenol resins, terpene phenolic resins, rosin esters, polyimide varnish, polyamic acid, polyaryl ether ketone, and polyetherimide.

From the viewpoint of ensuring the bundling properties of a glass fiber bundle and preventing the fiber bundle from fraying during treatment to generate fuzz and turning into floc, the film former is preferably a urethane resin or an epoxy resin.

As the film former, these can be used singly or in combination of two or more.

Examples of the urethane resin can include a resin obtained by reacting a diisocyanate compound with a polyol compound or a polyester compound.

Examples of the diisocyanate compound can include tetramethylene diisocyanate, pentamethylene diisocyanate, hexamethylene diisocyanate, heptamethylenediisocyanate, octamethylene diisocyanate, decamethylene diisocyanate, dodecamethylene diisocyanate, lysine diisocyanate, cyclohexylene diisocyanate, cyclohexylmethane diisocyanate, 2,2,4-trimethylhexamethylene diisocyanate, 2,4,4-trimethylhexamethylene diisocyanate, isopropylidenebis(4-cyclohexyl isocyanate), methylcyclohexane diisocyanate, isophorone diisocyanate, 2,2'-diphenylmethane diisocyanate (MDI), 2,4'-MDI, 4,4'-MDI, dicyclohexylmethane-4,4-diisocyanate (hydrogenated MDI), 2,4-tolylene diisocyanate (TDI), 2,6-TDI, 3-methylphenylmethane-4,4'diiisocyanate, m-phenylene diisocyanate, p-phenylene diisocyanate, chlorophenylene-2,4-diisocyanate, chlorophenylene-2,4-diisocyanate, naphthalene-1,5-diisocyanate, methaxylylene diisocyanate, tetramethylxylylene diisocyanate, norbornane diisocyanate, and mixtures thereof.

Examples of the polyol compound can include polyethylene glycol, polypropylene glycol, polytetramethylene ether glycol, polycarbonate diol, polybutadiene polyol, hydrogenated polybutadiene polyol, hydrogenated isoprenepolyol, acrylic polyol, 1,3-propanediol, butylene glycol, 1,4-butanediol, 2-methyl-propanediol, 1,5-pentanediol, 1,6-hexanediol, hexyleneglycol, glycerin, trimethylolpropane, trimethylol ethane, pentaerythritol, diethylene glycol, triethylene glycol, tetraethylene glycol, dipropylene glycol, and mixtures thereof.

Examples of the polyester compound can include condensates of a polyol compound and polycarboxylic acid, and compounds obtained by ring-opening polymerization of a cyclic ester. Examples of the polycarboxylic acid can include adipic acid, azelaic acid, pimelic acid, sebacic acid, dodecanedicarboxylic acid, maleic anhydride, fumaric acid, 1,3-cyclopentanedicarboxylic acid, 1,4-cyclohexane dicarboxylic acid, terephthalic acid, isophthalic acid, phthalic acid, 1,4-naphthalene dicarboxylic acid, biphenyldicarboxylic acid, and trimellitic acid. Examples of the compound obtained by ring-opening polymerization of a cyclic ester include poly($\varepsilon$-caprolactone).

Examples of the epoxy resin can include bisphenol A epoxy resins, bifunctional biphenyl epoxy resins, biphenyl modified novolac epoxy resins, bisphenol F epoxy resins, naphthol-cresol copolymerized novolac epoxy resins, naphthol-phenol copolymerized epoxy resins, dicyclopentadiene-phenol added epoxy resins, triphenylmethane epoxy resins, bisphenol S epoxy resins, phenol novolac epoxy resins, cresol novolac epoxy resins, tetraphenylethane epoxy resins, naphthol novolac epoxy resins, dicyclopentadiene epoxy resins, and modified products thereof, and mixtures thereof.

Examples of the vinyl acetate resin can include polyvinyl acetate which is a homopolymer of vinyl acetate, copolymers of vinyl acetate and other monomers copolymerizable with vinyl acetate (e.g., ethylene and propylene), and mixtures thereof.

Examples of the unsaturated polyester can include a resin obtained by subjecting aliphatic unsaturated dicarboxylic acid and aliphatic diol to an esterification reaction.

Examples of the modified polypropylene can include an acid-modified polypropylene modified with unsaturated carboxylic acid or an anhydride thereof, chlorinated polypropylene, and mixtures thereof.

Examples of the copolymer of unsaturated monomers can include copolymers composed of two or more unsaturated monomers, and mixtures thereof. Examples of the unsaturated monomer can include unsaturated carboxylic acid and unsaturated monomers other than unsaturated carboxylic acid. Examples of the unsaturated carboxylic acid can include acrylic acid, methacrylic acid, maleic acid (maleic anhydride), itaconic acid (itaconic anhydride), mesaconic acid, citraconic acid, and dodecenylsuccinic acid anhydride. Examples of the unsaturated monomer other than unsaturated carboxylic acid can include ethylene, propylene, styrene, isobutylene, methylstyrene, 2-methyl-2-butene, norbornene, stilbene, cyclopentene, dihydronaphthalene, butadiene, methyl acrylate, isoprenemethyl acrylate, ethyl acrylate, butyl acrylate, 2-ethylhexyl acrylate, methyl methacrylate, ethyl methacrylate, butyl methacrylate, butyl methacrylate, cyclohexyl acrylate, cyclohexyl methacrylate, vinyl chloride, allyl chloride, vinyl benzoate, 2-chloroethylvinyl ether, acrylonitrile, methacrylonitrile, $\alpha$-chloroacrylonitrile, acrylic acid chloride, N,N-dibutylacrylamide, methyl vinyl ketone, $\alpha$-chloromethyl acrylate, and methyl crotonate.

Examples of the vinyl ester resin can include bis vinyl ester resin and novolac vinyl ester resin.

Examples of the polyolefin can include copolymers of ethylene and glycidyl methacrylate.

Examples of the polyamide resin can include nylon 6, nylon 6/66, nylon 6/12, polyamide elastomers, and mixtures thereof.

Examples of the phenol resin can include water soluble resol resins.

Examples of the terpene phenolic resin can include copolymers of a terpene monomer and phenol.

As the rosin ester, an ester of rosin and a polyhydric alcohol can be used. Examples of the rosin can include gum rosin, wood rosin, tall oil rosin, and hydrogenated products thereof. Examples of the polyhydric alcohol include glycerin, pentaerythritol, dipentaerythritol, ethylene glycol, diethylene glycol, and triethylene glycol.

Examples of the polyimide varnish can include U-varnish-A (trade name) manufactured by Ube Industries, Ltd., U-varnish-S (trade name) manufactured by Ube Industries, Ltd., Likacoat® manufactured by New Japan Chemical Co., Ltd., OPTMER® manufactured by JSR Corporation, and SE812 (trade name) manufactured by Nissan Chemical Corporation.

Examples of the polyamic acid can include products synthesized by a reaction of a tetracarboxylic dianhydride with an aromatic diamine compound in a polar solvent.

Examples of the polyaryl ether ketone can include polyether ether ketone (PEEK), polyether ketone ketone (PEKK), and precursors thereof.

Examples of the polyetherimide can include a resin synthesized from 2,2-bis[4-(3,4-dicarboxy phenoxy)phenylpropane] and m-phenylenediamine.

The film former contained in the organic matter adhered to the surface of the glass fiber for resin reinforcement of the present embodiment can be detected by igniting the glass fiber in a firing furnace at 550° C. and analyzing the generated gas by a gas chromatography-mass spectrometer (e.g., manufactured by Shimadzu Corporation, trade name: GCMS-QP2010 Plus Ultra).

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyalkyleneimine, polyalkylpolyamine alkylamide derivatives, fatty acid amides, and quaternary ammonium salts.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of polyethylenepolyamines such as diethylenetriamine, triethylenetetramine, and tetraethylenepentamine and fatty acids such as lauric acid, myristic acid, palmitic acid, and stearic acid.

Examples of the quaternary ammonium salt include alkyltrimethylammonium salts such as lauryltrimethylammonium chloride.

As the lubricant, these can be used singly or in combination of two or more.

Examples of the surfactant include nonionic surfactants, cationic surfactants, anionic surfactants, and amphoteric surfactants.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine acetate, higher alkylamine hydrochloride, adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant can include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant can include amino acid amphoteric surfactants such as alkali metal salts of alkylaminopropionic acid, betaine amphoteric surfactants such as alkyldimethylbetaine, and imidazoline amphoteric surfactants.

Examples of the nitrogen content adjuster can include polyallylamine, aliphatic diamine, cycloaliphatic diamine, aromatic diamine, aliphatic polyamine, aromatic polyamine, cycloaliphatic polyamine, polyamideamine, cyanide compounds, imidazole compounds, polyalkyleneimine, polyvinylpyrrolidone, amino acids, polyalkylpolyamine alkylamide derivatives, fatty acid amide, alkylammonium salts, adducts of ethylene oxide to a higher alkylamine, condensates of a higher fatty acid and polyalkylene polyamine, salts of an ester of a higher fatty acid and alkanolamine, salts of a higher fatty acid amide, and alkylpyridinium salts.

Examples of the polyallylamine can include an acrylamide-diallylamine hydrochloride copolymer and a methyldiallylamine hydrochloride copolymer.

Examples of the aliphatic diamine can include ethylenediamine, triethylenediamine, tetramethylenediamine, pentamethylenediamine, and hexamethylenediamine.

Examples of the cycloaliphatic diamine can include isophorone diamine.

Examples of the aromatic diamine can include 4,4-diaminodiphenylmethane and bis(4-aminophenyl)sulfone.

Examples of the aliphatic polyamine can include diethylene triamine, triethylenetetramine, tetraethylene pentamine, and pentaethylene hexamine.

Examples of the cycloaliphatic polyamine can include isophorone diamine.

As the polyamideamine, one produced by subjecting a dimer acid obtained by dimerization of unsaturated fatty acid and polyethylene polyamine to a condensation reaction can be used. Examples of the dimer acid can include unsaturated fatty acids such as linoleic acid and linolenic acid, and those using natural oils including these oils as raw materials. Examples of the polyethylene polyamine can include ethylenediamine, diethylenetriamine, triethylenetetramine, tetraethylenepentamine, and pentaethylenehexamine.

Examples of the cyanide compound can include dicyandiamide.

Examples of the imidazole compound can include 2-methylimidazole, 2-phenylimidazole, and an imidazoline surfactant.

Examples of the polyalkyleneimine can include polyethyleneimine, polypropyleneimine, and derivatives thereof.

Examples of the polyvinylpyrrolidone include a polymer of N-vinyl-2-pyrrolidone and a derivative thereof.

Examples of the amino acid can include arginine, lysine, histidine, alanine, and phenylalanine.

As the nitrogen content adjuster, these compounds can be used singly or in combination of two or more. Further, compounds such as condensates using the above components as raw materials can also be used.

From the viewpoint of a large effect of increasing the amount of nitrogen of the organic matter adhered to the surface of the glass fiber for resin reinforcement, it is further preferable that the nitrogen content adjuster contain a compound containing a plurality of (e.g., 2 to 20000) nitrogen atoms in one molecule.

Examples of the compound containing a plurality of nitrogen atoms in one molecule can include polyallylamine, aliphatic diamine, cycloaliphatic diamine, aromatic diamine, aliphatic polyamine, aromatic polyamine, cycloaliphatic polyamine, polyamideamine, imidazole compounds, polyalkyleneimine, polyvinylpyrrolidone, polyalkylpolyamine alkylamide derivatives, and condensates of a higher fatty acid and polyalkylene polyamine.

As the polyallylamine, aliphatic diamine, cycloaliphatic diamine, aromatic diamine, aliphatic polyamine, cycloaliphatic polyamine, polyamideamine, imidazole compounds, polyalkyleneimine, and polyvinylpyrrolidone as the compound containing a plurality of nitrogen atoms in one molecule, those described above can be used.

The nitrogen content adjuster contained the organic matter adhered to the surface of the glass fiber for resin reinforcement of the present embodiment can be detected by igniting the glass fiber in a firing furnace at 550° C. and analyzing the generated gas by a gas chromatography-mass spectrometer (e.g., trade name: GCMS-QP2010 Plus Ultra manufactured by Shimadzu Corporation).

The glass fiber-reinforced resin molded article of the present embodiment can be obtained by, for example, kneading the chopped strands having a predetermined length and a thermoplastic resin by a twin-screw kneader, and conducting injection molding using the obtained resin pellets.

Examples of the thermoplastic resin can include polyethylene, polypropylene, polystyrene, styrene/maleic anhydride resins, styrene/maleimide resins, polyacrylonitrile (PAN), acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide (PA), polyacetal (POM), polyethylene terephthalate (PET), polybutylene terephthalate (PBT), polytrimethylene terephthalate (PTT), polycyclohexylenedimethylene terephthalate (PCT), polycarbonate (PC), polyarylene sulfide, polyethersulfone (PES), polyphenylsulfone (PPSU), polyphenylene ether (PPE), modified polyphenylene ether (m-PPE), polyaryl ether ketone (PAEK), liquid crystal polymer (LCP), fluororesins, polyetherimide (PEI), siloxane modified polyetherimide, polyarylate (PAR), polysulfone (PSF, PSU), polyphthalamide (PPA), polyamideimide (PAI), polyaminobismaleimide (PABM), thermoplastic polyimide (TPI), polybenzimidazole (PBI), polyethylene naphthalate (PEN), polybutylene naphthalate (PBN), ethylene/vinyl acetate (EVA) resins, ionomer (IO) resins, polybutadiene, styrene/butadiene resins, polybutylene, polymethylpentene (PMP), olefin/vinyl alcohol resins, cyclic olefin resins (COP), cellulose resins, and polylactic acid.

From the viewpoint of high heat resistance when being formed into a glass fiber-reinforced resin molded article, the thermoplastic resin is preferably a thermoplastic resin having a glass transition temperature of 100° C. or more, and more preferably a thermoplastic resin having a glass transition temperature of 135° C. or more.

Here, the glass transition temperature of the thermoplastic resin can be measured by JIS K 7121:2012.

Examples of the thermoplastic resin having a glass transition temperature of 100° C. or more can include resins such as modified polyphenylene ether (m-PPE), acrylonitrile/butadiene/styrene (ABS), polyphthalamide (PPA), polyaryl ether ketone (PAEK), polycarbonate (PC), siloxane modified polyetherimide, polysulfone (PSF, PSU), polyarylate (PAR), polyphenylene ether (PPE), polyetherimide (PEI), polyphenylsulfone (PPSU), polyether sulfone (PES), thermoplastic polyimide (TPI), and polyamideimido (PAI).

Examples of the thermoplastic resin having a glass transition temperature of 135° C. or more can include resins such as polyaryl ether ketone (PAEK), polycarbonate (PC), siloxane modified polyetherimide, polysulfone (PSF, PSU), polyarylate (PAR), polyphenylene ether (PPE), polyetherimide (PEI), polyphenylsulfone (PPSU), polyether sulfone (PES), thermoplastic polyimide (TPI), and polyamideimido (PAI).

The thermoplastic resin is further preferably thermoplastic polyimide or polyaryl ether ketone, particularly preferably polyetherimide or polyaryl ether ketone, and most preferably polyaryl ether ketone since the effect of improving the strength of the glass fiber-reinforced resin molded article due to use of the glass fiber for resin reinforcement of the present embodiment is particularly high.

Examples of the polyaryl ether ketone can include polyetherketone (PEK), polyetheretherketone (PEEK), polyetherketoneketone (PEKK), and polyetheretherketoneketone (PEEKK).

The glass fiber-reinforced resin molded article can be obtained by a known molding method such as injection compression molding method, two-color molding method, hollow molding method, foam molding method (including supercritical fluid foam molding method), insert molding method, in-mold coating molding method, extrusion molding method, sheet molding method, thermal molding method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method.

The glass fiber-reinforced resin molded article of the present embodiment can be used in, for example, parts such as cases and frames of portable electronic devices exemplified by smartphones, automobile electrical components such as battery tray covers, sensors, and coil bobbins, electronic device parts other than portable electronic devices, and electrical connection terminal parts.

Then, Examples and Comparative Examples of the present invention will be shown.

EXAMPLES

Example 1

In the present example, first, a glass fiber (glass strands) obtained by bundling glass filaments which comprise a circular cross-sectional shape having a fiber diameter of 9.0 μm and have a high strength and high modulus glass composition was produced. Then, γ-aminopropyltriethoxysilane serving as a nitrogen-containing silane coupling agent, a urethane resin (manufactured by ADEKA Corporation, trade name: Adeka New Ace Y65-55) serving as a film former, and 4,4-diaminodiphenylmethane serving as a nitrogen content adjuster were used, and 3.20 parts by mass of the film former and 0.20 parts by mass of the nitrogen content adjuster were mixed per 1 part by mass of the nitrogen-containing silane coupling agent, and a treatment liquid having the composition of the organic matter was prepared such that the solid content was 2.50%. Then, the glass strands obtained in the present example were allowed to pass through a treatment tank in which the treatment liquid is stored and dried at a temperature of 120° C. for 8 hours. The step of allowing the obtained glass strands to pass through the treatment tank in which the treatment liquid is stored and drying the glass strands was carried out further two times (three times in total), the obtained glass strands were cut into a length of 3 mm to produce chopped strands of the glass fiber for resin reinforcement of the present example.

The amount of nitrogen N of the organic matter adhered to the glass fiber surface in the chopped strands of the glass fiber for resin reinforcement of the present example and the amount of carbon C of the organic matter were determined by measuring the amount of carbon dioxide gas in the gas generated by igniting 200 to 400 mg of the chopped strands at a temperature of 900° C. for 250 seconds and the amount of nitrogen gas obtained by reducing a nitrogen oxide with reduced copper by gas chromatography using an NC analyzer (manufactured by Sumika Chemical Analysis Service, Ltd., trade name: SUMIGRAPH NC-TRINITY), and the ignition loss L was measured in accordance with JIS R 3420:2013 to thereby calculate the value of C/N and the value of $(N \times C)^{1/2}/L$. The absence or presence of the film former was detected by igniting the chopped strands in a firing furnace at 550° C. and analyzing the generated gas by a gas chromatography-mass spectrometer (e.g., manufactured by Shimadzu Corporation, trade name: GCMS-QP2010 Plus Ultra).

Then, for the chopped strands, the easy cuttability evaluation and the kneader fuzz evaluation were conducted by the methods described below. The results are shown in Table 1.

Then, the chopped strands and polyether ether ketone (manufactured by Polyplastics-Evonik Corporation, trade name: VESTAKEEP2000G) were kneaded by a twin-screw kneader (manufactured by SHIBAURA MACHINE CO., LTD., trade name: TEM-26SS) with a screw rotation speed of 100 rpm at a temperature of 390° C. to thereby produce resin pellets having a glass fiber content of 30% by mass.

Then, the resin pellets obtained in the present example were used to conduct injection molding in an injection molding apparatus (manufactured by NISSEI PLASTIC INDUSTRIAL CO., LTD., trade name: NEX80-9E) at a mold temperature of 200° C. and a nozzle temperature of 415° C. to thereby produce A-type dumbbell test pieces (thickness: 4 mm) in accordance with JIS K 7164:2005.

Then, the A-type dumbbell test piece obtained in the present example was used to measure the tensile strength, the flexural strength, and the notched Izod impact strength by the methods described below. The results are shown in Table 1.

[Easy Cuttability Evaluation]

The mass of the chopped strands passed through the sieve when 1 kg of the chopped strands were taken in 100 g portions on a plain metal sieve having a frame diameter of 200 mm, an opening of 2.8 mm, and a wire diameter of 1.12 mm in accordance with JIS Z 8801-1:2019 and shaken for 30 seconds was measured. The proportion of the mass of the chopped strands passed through the sieve to the mass of the chopped strands before being sieved of 60 to 100% by mass was evaluated as A, the proportion of 40 to 59% by mass was evaluated as B, and the proportion of 0 to 39% by mass was evaluated as C.

[Kneader Fuzz Evaluation]

1 kg of the glass fiber for resin reinforcement was put in a kneading chamber of a double arm kneader (manufactured by Nihon Spindle Manufacturing Co., Ltd., trade name: SR1-1), a weight of 6 kg was placed thereon, the glass fiber for resin reinforcement was kneaded for 4 min, and then the mass of the fuzz generated was measured. The mass of fuzz of 0.15 kg or less was evaluated as A, the mass of fuzz of more than 0.15 kg and 0.30 kg or less was evaluated as B, and the mass of fuzz of more than 0.30 kg and 0.60 kg or less was evaluated as C.

[Tensile Strength]

Using the A-type dumbbell test piece (thickness: 4 mm), the tensile strength was measured in accordance with JIS K 7164:2005 under a condition of a test temperature of 23° C. using a precision universal tester (manufactured by Shimadzu Corporation, trade name: Autograph AG-Xplus50 kN).

[Flexural Strength]

The A-type dumbbell test piece (thickness: 4 mm) was processed into a class I test piece, and the flexural strength was measured in accordance with JIS K 7017:1999 under a condition of a test temperature of 23° C. using a precision universal tester (manufactured by Shimadzu Corporation, trade name: Autograph AG-Xplus50 kN).

[Notched Izod Impact Strength]

The A-type dumbbell test piece (thickness: 4 mm) was processed into a type 1 test piece having a type A notch, and the notched Izod impact strength was measured in accordance with JIS K 7110:1999.

Example 2

In the present example, a treatment liquid having the composition of the organic matter was prepared in the same manner as in Example 1 except that 0.50 parts by mass of the film former and 0.10 parts by mass of the nitrogen content adjuster were mixed per 1 part by mass of the nitrogen-containing silane coupling agent, and chopped strands of the glass fiber for resin reinforcement of the present example were produced in the same manner as in Example 1 except that the treatment of allowing the glass strands obtained in Example 1 to pass through the treatment tank in which the treatment liquid is stored and drying the glass strands was carried out twice in total.

Then, for the chopped strands of the glass fiber for resin reinforcement of the present example, the amount of nitrogen N of the organic matter adhered to the glass fiber surface, the amount of carbon C of the organic matter, and the ignition loss L were measured in the same manner as in Example 1 to thereby calculate the value of C/N and the value of $(N \times C)^{1/2}/L$, and the absence or presence of the film former was detected.

Then, for the chopped strands, the easy cuttability evaluation and the kneader fuzz evaluation were conducted in the same manner as in Example 1. The results are shown in Table 1.

Then, an A-type dumbbell test piece (thickness: 4 mm) in accordance with JIS K 7164:2005 was produced in the same manner as in Example 1 except that the chopped strands obtained in the present example were used.

Then, the tensile strength, the flexural strength, and the notched Izod impact strength were measured in the same manner as in Example 1 except that the A-type dumbbell test piece obtained in the present example was used. The results are shown in Table 1.

Example 3

In the present example, a treatment liquid having the composition of the organic matter was prepared in the same manner as in Example 1 except that 2.00 parts by mass of the film former and 0.65 parts by mass of the nitrogen content adjuster were mixed per 1 part by mass of the nitrogen-containing silane coupling agent, and chopped strands of the glass fiber for resin reinforcement of the present example were produced in the same manner as in Example 1 except that the treatment of allowing the glass strands obtained in Example 1 to pass through the treatment tank in which the treatment liquid is stored and drying the glass strands was carried out 5 times in total.

Then, for the chopped strands of the glass fiber for resin reinforcement of the present example, the amount of nitrogen N of the organic matter adhered to the glass fiber surface, the amount of carbon C of the organic matter, and the ignition loss L were measured in the same manner as in Example 1 to thereby calculate the value of C/N and the value of $(N \times C)^{1/2}/L$, and the absence or presence of the film former was detected.

Then, for the chopped strands, the easy cuttability evaluation and the kneader fuzz evaluation were conducted in the same manner as in Example 1. The results are shown in Table 1.

Then, an A-type dumbbell test piece (thickness: 4 mm) in accordance with JIS K 7164:2005 was produced in the same manner as in Example 1 except that the chopped strands obtained in the present example were used.

Then, the tensile strength, the flexural strength, and the notched Izod impact strength were measured in the same manner as in Example 1 except that the A-type dumbbell test piece obtained in the present example was used. The results are shown in Table 1.

Example 4

In the present example, a treatment liquid having the composition of the organic matter was prepared in the same manner as in Example 1 except that 0.30 parts by mass of the film former and 0.07 parts by mass of the nitrogen content adjuster were mixed per 1 part by mass of the nitrogen-containing silane coupling agent, and chopped strands of the glass fiber for resin reinforcement of the present example were produced in the same manner as in Example 1 except that the treatment of allowing the glass strands obtained in Example 1 to pass through the treatment tank in which the treatment liquid is stored and drying the glass strands was carried out 3 times in total.

Then, for the chopped strands of the glass fiber for resin reinforcement of the present example, the amount of nitrogen N of the organic matter adhered to the glass fiber surface, the amount of carbon C of the organic matter, and the ignition loss L were measured in the same manner as in Example 1 to thereby calculate the value of C/N and the value of $(N \times C)^{1/2}/L$, and the absence or presence of the film former was detected.

Then, for the chopped strands, the easy cuttability evaluation and the kneader fuzz evaluation were conducted in the same manner as in Example 1. The results are shown in Table 1.

Then, an A-type dumbbell test piece (thickness: 4 mm) in accordance with JIS K 7164:2005 was produced in the same manner as in Example 1 except that the chopped strands obtained in the present example were used.

Then, the tensile strength, the flexural strength, and the notched Izod impact strength were measured in the same manner as in Example 1 except that the A-type dumbbell test piece obtained in the present example was used. The results are shown in Table 1.

Example 5

In the present example, a treatment liquid having the composition of the organic matter was prepared in the same manner as in Example 1 except that 0.83 parts by mass of the film former and 0.17 parts by mass of the nitrogen content adjuster were mixed per 1 part by mass of the nitrogen-containing silane coupling agent, and chopped strands of the glass fiber for resin reinforcement of the present example were produced in the same manner as in Example 1 except that the treatment of allowing the glass strands obtained in Example 1 to pass through the treatment tank in which the treatment liquid is stored and drying the glass strands was carried out once in total.

Then, for the chopped strands of the glass fiber for resin reinforcement of the present example, the amount of nitrogen N of the organic matter adhered to the glass fiber surface, the amount of carbon C of the organic matter, and the ignition loss L were measured in the same manner as in Example 1 to thereby calculate the value of C/N and the value of $(N \times C)^{1/2}/L$, and the absence or presence of the film former was detected. Then, for the chopped strands, the easy cuttability evaluation and the kneader fuzz evaluation were conducted in the same manner as in Example 1. The results are shown in Table 1.

Then, an A-type dumbbell test piece (thickness: 4 mm) in accordance with JIS K 7164:2005 was produced in the same manner as in Example 1 except that the chopped strands obtained in the present example were used.

Then, the tensile strength, the flexural strength, and the notched Izod impact strength were measured in the same manner as in Example 1 except that the A-type dumbbell test piece obtained in the present example was used. The results are shown in Table 1.

Example 6

In the present example, a treatment liquid having the composition of the organic matter was prepared in the same manner as in Example 1 except that 1.00 part by mass of the film former and 0.20 parts by mass of the nitrogen content adjuster were mixed per 1 part by mass of the nitrogen-containing silane coupling agent, and chopped strands of the glass fiber for resin reinforcement of the present example were produced in the same manner as in Example 1 except that the treatment of allowing the glass strands obtained in Example 1 to pass through the treatment tank in which the treatment liquid is stored and drying the glass strands was carried out once in total.

Then, for the chopped strands of the glass fiber for resin reinforcement of the present example, the amount of nitrogen N of the organic matter adhered to the glass fiber surface, the amount of carbon C of the organic matter, and the ignition loss L were measured in the same manner as in Example 1 to thereby calculate the value of C/N and the value of $(N \times C)^{1/2}/L$, and the absence or presence of the film former was detected.

Then, for the chopped strands, the easy cuttability evaluation and the kneader fuzz evaluation were conducted in the same manner as in Example 1. The results are shown in Table 1.

Then, an A-type dumbbell test piece (thickness: 4 mm) in accordance with JIS K 7164:2005 was produced in the same manner as in Example 1 except that the chopped strands obtained in the present example were used.

Then, the tensile strength, the flexural strength, and the notched Izod impact strength were measured in the same manner as in Example 1 except that the A-type dumbbell test piece obtained in the present example was used. The results are shown in Table 1.

Example 7

In the present example, a treatment liquid having the composition of the organic matter was prepared in the same manner as in Example 1 except that 1.25 parts by mass of the film former and 0.25 parts by mass of the nitrogen content adjuster were mixed per 1 part by mass of the nitrogen-containing silane coupling agent, and chopped strands of the glass fiber for resin reinforcement of the present example were produced in the same manner as in Example 1 except that the treatment of allowing the glass strands obtained in Example 1 to pass through the treatment tank in which the treatment liquid is stored and drying the glass strands was carried out once in total.

Then, for the chopped strands of the glass fiber for resin reinforcement of the present example, the amount of nitrogen N of the organic matter adhered to the glass fiber surface, the amount of carbon C of the organic matter, and the ignition loss L were measured in the same manner as in Example 1 to thereby calculate the value of C/N and the value of $(N \times C)^{1/2}/L$, and the absence or presence of the film former was detected.

Then, for the chopped strands, the easy cuttability evaluation and the kneader fuzz evaluation were conducted in the same manner as in Example 1. The results are shown in Table 1.

Then, an A-type dumbbell test piece (thickness: 4 mm) in accordance with JIS K 7164:2005 was produced in the same manner as in Example 1 except that the chopped strands obtained in the present example were used.

Then, the tensile strength, the flexural strength, and the notched Izod impact strength were measured in the same manner as in Example 1 except that the A-type dumbbell test piece obtained in the present example was used. The results are shown in Table 1.

Comparative Example 1

In the present comparative example, a treatment liquid having the composition of the organic matter was prepared in the same manner as in Example 1 except that 0.32 parts by mass of the film former and 0 parts by mass of the nitrogen content adjuster were mixed per 1 part by mass of the nitrogen-containing silane coupling agent, and chopped strands of the glass fiber for resin reinforcement of the present comparative example were produced in the same manner as in Example 1 except that the treatment of allowing the glass strands obtained in Example 1 to pass through the treatment tank in which the treatment liquid is stored and drying the glass strands was carried out four times in total.

Then, for the chopped strands of the glass fiber for resin reinforcement of the present comparative example, the amount of nitrogen N of the organic matter adhered to the glass fiber surface, the amount of carbon C of the organic matter, and the ignition loss L were measured in the same manner as in Example 1 to thereby calculate the value of C/N and the value of $(N \times C)^{1/2}/L$, and the absence or presence of the film former was detected.

Then, for the chopped strands, the easy cuttability evaluation and the kneader fuzz evaluation were conducted in the same manner as in Example 1. The results are shown in Table 2.

Then, an A-type dumbbell test piece (thickness: 4 mm) in accordance with JIS K 7164:2005 was produced in the same manner as in Example 1 except that the chopped strands obtained in the present comparative example were used.

Then, the tensile strength, the flexural strength, and the notched Izod impact strength were measured in the same manner as in Example 1 except that the A-type dumbbell test piece obtained in the present comparative example was used. The results are shown in Table 2.

Comparative Example 2

In the present comparative example, a treatment liquid having the composition of the organic matter was prepared in the same manner as in Example 1 except that 5.00 parts by mass of the film former and 1.00 part by mass of the nitrogen content adjuster were mixed per 1 part by mass of the nitrogen-containing silane coupling agent, and chopped strands of the glass fiber for resin reinforcement of the present comparative example were produced in the same manner as in Example 1 except that the treatment of allowing the glass strands obtained in Example 1 to pass through the treatment tank in which the treatment liquid is stored and drying the glass strands was carried out once in total.

Then, for the chopped strands of the glass fiber for resin reinforcement of the present comparative example, the amount of nitrogen N of the organic matter adhered to the glass fiber surface, the amount of carbon C of the organic matter, and the ignition loss L were measured in the same manner as in Example 1 to thereby calculate the value of C/N and the value of $(N \times C)^{1/2}/L$, and the absence or presence of the film former was detected.

Then, for the chopped strands, the easy cuttability evaluation and the kneader fuzz evaluation were conducted in the same manner as in Example 1. The results are shown in Table 2.

Then, an A-type dumbbell test piece (thickness: 4 mm) in accordance with JIS K 7164:2005 was produced in the same manner as in Example 1 except that the chopped strands obtained in the present comparative example were used.

Then, the tensile strength, the flexural strength, and the notched Izod impact strength were measured in the same manner as in Example 1 except that the A-type dumbbell test piece obtained in the present comparative example was used. The results are shown in Table 2.

Comparative Example 3

In the present comparative example, a treatment liquid having the composition of the organic matter was prepared in the same manner as in Example 1 except that 5.00 parts by mass of the film former and 1.00 part by mass of the nitrogen content adjuster were mixed per 1 part by mass of the nitrogen-containing silane coupling agent, and chopped strands of the glass fiber for resin reinforcement of the present comparative example were produced in the same manner as in Example 1 except that the treatment of allowing the glass strands obtained in Example 1 to pass through the treatment tank in which the treatment liquid is stored and drying the glass strands was carried out twice in total.

Then, for the chopped strands of the glass fiber for resin reinforcement of the present comparative example, the amount of nitrogen N of the organic matter adhered to the glass fiber surface, the amount of carbon C of the organic matter, and the ignition loss L were measured in the same manner as in Example 1 to thereby calculate the value of C/N and the value of $(N \times C)^{1/2}/L$, and the absence or presence of the film former was detected.

Then, for the chopped strands, the easy cuttability evaluation and the kneader fuzz evaluation were conducted in the same manner as in Example 1. The results are shown in Table 2.

Then, an A-type dumbbell test piece (thickness: 4 mm) in accordance with JIS K 7164:2005 was produced in the same manner as in Example 1 except that the chopped strands obtained in the present comparative example were used.

Then, the tensile strength, the flexural strength, and the notched Izod impact strength were measured in the same manner as in Example 1 except that the A-type dumbbell test piece obtained in the present comparative example was used. The results are shown in Table 2.

Comparative Example 4

In the present comparative example, a treatment liquid having the composition of the organic matter was prepared in the same manner as in Example 1 except that 5.00 parts by mass of the film former and 1.00 part by mass of the nitrogen content adjuster were mixed per 1 part by mass of the nitrogen-containing silane coupling agent, and chopped strands of the glass fiber for resin reinforcement of the present comparative example were produced in the same manner as in Example 1 except that the treatment of allowing the glass strands obtained in Example 1 to pass through the treatment tank in which the treatment liquid is stored and drying the glass strands was carried out 3 times in total.

Then, for the chopped strands of the glass fiber for resin reinforcement of the present comparative example, the amount of nitrogen N of the organic matter adhered to the glass fiber surface, the amount of carbon C of the organic matter, and the ignition loss L were measured in the same manner as in Example 1 to thereby calculate the value of C/N and the value of $(N{\times}C)^{1/2}/L$, and the absence or presence of the film former was detected.

Then, for the chopped strands, the easy cuttability evaluation and the kneader fuzz evaluation were conducted in the same manner as in Example 1. The results are shown in Table 2.

Then, an A-type dumbbell test piece (thickness: 4 mm) in accordance with JIS K 7164:2005 was produced in the same manner as in Example 1 except that the chopped strands obtained in the present comparative example were used.

Then, for the chopped strands of the glass fiber for resin reinforcement of the present comparative example, the amount of nitrogen N of the organic matter adhered to the glass fiber surface, the amount of carbon C of the organic matter, and the ignition loss L were measured in the same manner as in Example 1 to thereby calculate the value of C/N and the value of $(N{\times}C)^{1/2}/L$, and the absence or presence of the film former was detected.

Then, for the chopped strands, the easy cuttability evaluation and the kneader fuzz evaluation were conducted in the same manner as in Example 1. The results are shown in Table 2.

Then, an A-type dumbbell test piece (thickness: 4 mm) in accordance with JIS K 7164:2005 was produced in the same manner as in Example 1 except that the chopped strands obtained in the present comparative example were used.

Then, the tensile strength, the flexural strength, and the notched Izod impact strength were measured in the same manner as in Example 1 except that the A-type dumbbell test piece obtained in the present comparative example was used. The results are shown in Table 2.

TABLE 1

| | Example 1 | Example 2 | Example 3 | Example 4 | Example 5 | Example 6 | Example 7 |
|---|---|---|---|---|---|---|---|
| Amount of nitrogen N (% by mass) | 0.120 | 0.081 | 0.251 | 0.139 | 0.055 | 0.042 | 0.035 |
| Amount of carbon C (% by mass) | 0.619 | 0.457 | 1.015 | 0.630 | 0.414 | 0.335 | 0.324 |
| Ignition loss L (% by mass) | 1.020 | 0.760 | 1.690 | 0.950 | 0.500 | 0.420 | 0.450 |
| C/N | 5.16 | 5.64 | 4.04 | 4.53 | 7.53 | 7.98 | 9.26 |
| $(N \times C)^{1/2}/L$ | 0.267 | 0.253 | 0.299 | 0.311 | 0.302 | 0.282 | 0.237 |
| Detection of film former | Yes | Yes | Yes | Yes | Yes | Yes | Yes |
| Tensile strength (MPa) | 206 | 203 | 211 | 210 | 205 | 204 | 202 |
| Flexural strength (MPa) | 320 | 322 | 330 | 330 | 309 | 310 | 309 |
| Notched Izod impact strength (kJ/m$^2$) | 13 | 14 | 14 | 15 | 13 | 13 | 13 |
| Easy cuttability | A | A | B | B | A | A | A |
| Kneader fuzzing | A | A | B | B | A | A | A |

TABLE 2

| | Comparative Example 1 | Comparative Example 2 | Comparative Example 3 | Comparative Example 4 | Comparative Example 5 |
|---|---|---|---|---|---|
| Amount of nitrogen N (% by mass) | 0.523 | 0.011 | 0.028 | 0.046 | 0.013 |
| Amount of carbon C (% by mass) | 0.887 | 0.213 | 0.456 | 0.703 | 0.125 |
| Ignition loss L (% by mass) | 1.363 | 0.360 | 0.720 | 1.090 | 0.200 |
| C/N | 1.70 | 19.36 | 16.29 | 15.28 | 9.62 |
| $(N \times C)^{1/2}/L$ | 0.500 | 0.134 | 0.157 | 0.165 | 0.202 |
| Detection of film former | Yes | Yes | Yes | Yes | Yes |
| Tensile strength (MPa) | 200 | 190 | 191 | 193 | 186 |
| Flexural strength (MPa) | 314 | 297 | 297 | 299 | 285 |
| Notched Izod impact strength (kJ/m$^2$) | 14 | 12 | 12 | 11 | 11 |
| Easy cuttability | C | A | A | A | A |
| Kneader fuzzing | C | A | A | A | A |

Then, the tensile strength, the flexural strength, and the notched Izod impact strength were measured in the same manner as in Example 1 except that the A-type dumbbell test piece obtained in the present comparative example was used. The results are shown in Table 2.

Comparative Example 5

In the present comparative example, chopped strands were produced in the same manner as the conditions described in Example 1 of Japanese Patent Laid-Open No. 2000-44793 except that glass filaments which comprise a circular cross-sectional shape having a fiber diameter of 9.0 μm and have a high strength and high modulus glass composition were used as the glass fiber.

As seen in Table 1, according to the glass fibers for resin reinforcement of Examples 1 to 7 in which the value of $(N{\times}C)^{1/2}/L$ is in the range of 0.220 to 0.405, it is demonstrated that fiber-reinforced resin molded articles comprising excellent processability such that both the easy cuttability evaluation and the kneader fuzz evaluation are A or B, and comprising excellent mechanical properties of tensile strength of 200 MPa or more, flexural strength of 305 MPa or more, and notched Izod impact strength of 13 KJ/m$^2$ or more can be obtained.

On the other hand, as seen in Table 2, according to the glass fiber for resin reinforcement of Comparative Example 1 in which the value of $(N{\times}C)^{1/2}/L$ is more than 0.405, the easy cuttability evaluation is C and the kneader fuzz evaluation is C, so that it is demonstrated that the processability is insufficient, and according to the glass fibers for resin reinforcement of Comparative Examples 2 to 5 in which the value of $(N\times C)^{1/2}/L$ is less than 0.220, it is demonstrated that the fiber-reinforced resin molded article comprising excellent mechanical properties cannot be obtained.

The invention claimed is:

1. A glass fiber for resin reinforcement, comprising a glass fiber, and organic matter adhered to a surface of the glass fiber, wherein an amount of nitrogen N of the organic matter is in a range of 0.010 to 0.600% by mass based on a total amount of the glass fiber for resin reinforcement;

an amount of carbon C of the organic matter is in a range of 0.120 to 1.500% by mass based on the total amount of the glass fiber for resin reinforcement;

an ignition loss L of the glass fiber for resin reinforcement is in a range of 0.200 to 2.000% by mass; and the N, C, and L satisfy a following formula (1):

$$0.220 \le (N \times C)^{1/2} \big/ L \le 0.405 \tag{1}$$

2. The glass fiber for resin reinforcement according to claim 1, wherein the N and C satisfy a following formula (a):

$$2.90 \le C/N \le 6.50 \tag{a}$$

3. The glass fiber for resin reinforcement according to claim 1, wherein the N and C satisfy a following formula (b):

$$4.85 \le C/N \le 6.20. \tag{b}$$

4. The glass fiber for resin reinforcement according to claim 1, wherein the amount of nitrogen N of the organic matter is in a range of 0.030 to 0.270% by mass based on the total amount of the glass fiber for resin reinforcement;

the amount of carbon C of the organic matter is in a range of 0.300 to 1.200% by mass based on the total amount of the glass fiber for resin reinforcement;

the ignition loss L of the glass fiber for resin reinforcement is in a range of 0.400 to 1.800% by mass; and the N, C, and L satisfy a following formula (2):

$$0.245 \le (N \times C)^{1/2} \big/ L \le 0.274 \tag{2}$$

5. The glass fiber for resin reinforcement according to claim 1, wherein the organic matter comprises a silane coupling agent containing nitrogen.

6. The glass fiber for resin reinforcement according to claim 1, wherein the organic matter comprises a film former.

7. The glass fiber for resin reinforcement according to claim 1, wherein the glass fiber is in any one form selected from a group consisting of chopped strand, roving, chopped strand mat, and milled fiber.

8. A glass fiber-reinforced resin molded article, comprising the glass fiber for resin reinforcement according to claim 1, and a thermoplastic resin having a glass transition temperature of 100° C. or more.

9. A glass fiber-reinforced resin molded article, comprising the glass fiber for resin reinforcement according to claim 1, and polyaryl ether ketone.

* * * * *